United States Patent

Reynolds

[15] 3,641,829
[45] Feb. 15, 1972

[54] PISTON SHOE HOLDDOWN ASSEMBLY

[72] Inventor: David W. Reynolds, West Des Moines, Iowa

[73] Assignee: Delavin Manufacturing Co.

[22] Filed: Feb. 16, 1970

[21] Appl. No.: 11,441

[52] U.S. Cl. ..................................74/60, 92/57, 91/507
[51] Int. Cl. ........................................F01b 13/04, F01b 3/02
[58] Field of Search ..................92/57; 91/507, 499; 74/60

[56] References Cited

UNITED STATES PATENTS

| | | | |
|---|---|---|---|
| 2,365,309 | 12/1944 | Talbot | 74/60 X |
| 2,947,182 | 8/1960 | Wahlmark | 74/60 |
| 3,011,453 | 12/1961 | Budzich | 91/499 X |
| 3,173,376 | 3/1965 | Hulman et al. | 91/507 X |
| 3,207,082 | 9/1965 | Budzich et al. | 91/507 |
| 3,479,963 | 11/1969 | Randa et al. | 91/507 X |

FOREIGN PATENTS OR APPLICATIONS

| | | | |
|---|---|---|---|
| 1,007,446 | 10/1965 | Great Britain | 91/499 |

Primary Examiner—Martin P. Schwadron
Assistant Examiner—Irwin C. Cohen
Attorney—Molinare, Alegretti, Newitt & Witcoff

[57] ABSTRACT

A piston shoe holddown assembly for maintaining the piston shoes of an axial piston fluid pressure device against the cam surface of the cam plate includes a holddown plate overlying a shouldered portion of the piston shoes and an annular groove about the circumference of a recess in the cam plate having a resilient retaining ring radially expanded into the groove and overlying the holddown plate.

6 Claims, 3 Drawing Figures

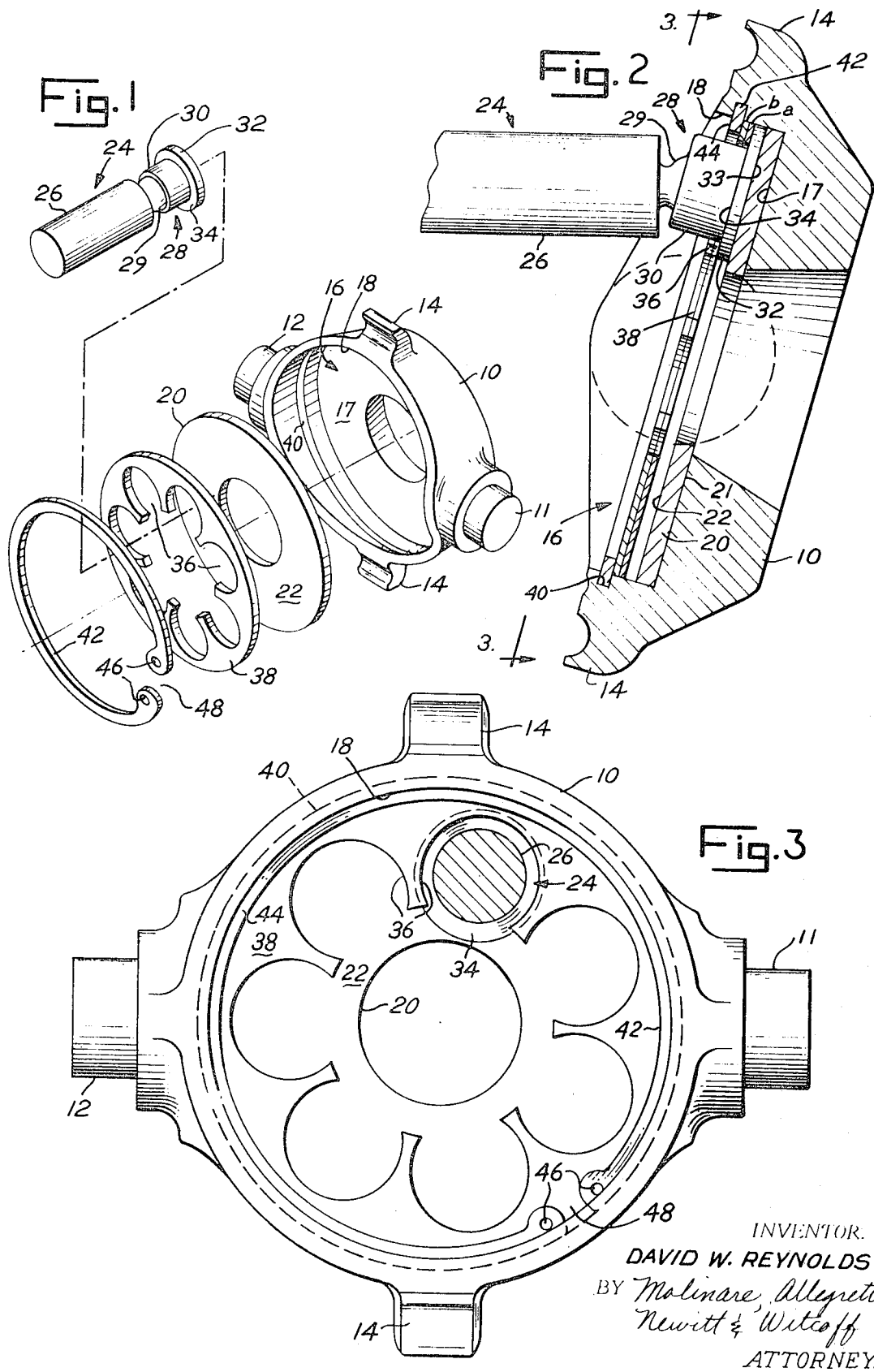

3,641,829

PISTON SHOE HOLDDOWN ASSEMBLY

BACKGROUND AND SUMMARY OF THE INVENTION

This invention relates to a holddown assembly and more particularly, to an assembly for maintaining the shoes of an axial piston fluid pressure device in slideable contact with the cam surface of a cam or swash plate.

In axial piston devices, for example of the type employed as pumps or motors in a hydraulic system, it is important the the pivotal piston shoes of such devices are maintained in slideable contact with the tilted cam or swash plate. In such devices the piston shoe tends to separate from the cam or swash plate when the piston is on the suction stroke. On the discharge stroke the piston shoe is normally pressurized against the cam plate by way of the substantial discharge pressure in its cylinder. However, when the same piston is on the suction stroke, the pressure in the cylinder frequently is reduced to less than atmospheric pressure, thus tending to move the shoe of such piston away from its cam surface.

Various constructions have been employed in the past to insure that the piston shoes of the various pistons of such axial piston devices are maintained at all times, and in particular during the suction stroke, in slideable contact with the cam surface of the cam plate. Several of these prior assemblies have employed apertured holddown plates which overlie portions of the piston shoes, the pistons extending outward from the cam surface of the cam plate through the respective apertures of the holddown plate. The holddown plate in these prior assemblies is then, in turn, helddown by relatively elaborate clamp or bracket devices which must be affixed to the cam plate or by elaborate ball and socket arrangements which may or may not be spring loaded against the holddown and cam plate. Since each of the prior holddown assembly constructions are relatively elaborate, they generally necessitate the provision of numerous component parts and assembling steps which frequently result in increased effort and expense in both manufacture of the parts themselves as well as the cost of assembling the parts into the completed holddown construction.

The piston shoe holddown assembly of the invention eliminates the need for elaborate and expensive assemblies. In the holddown assembly of the invention, the piston shoes are oriented in their desired positions relative to the cam or swash plate and a simple resilient retaining ring is snapped, in a single step operation, into a groove in the perimeter of a recess in the cam plate. Thereby the holddown assembly of my invention not only eliminates the need for the several components that were previously necessary, but is simple to both assemble and disassemble and inexpensive to manufacture. Moreover, in the holddown assembly of the invention, the piston shoes are not only maintained in contact against the cam plate, but are readily slideable during such contact relative to both the cam plate and the resilient retaining member.

In a preferred aspect of the invention, an axial piston fluid pressure device cam plate includes a recess in one of the faces of the cam plate and a planar surface in the recess. A plurality of piston shoes extend into the recess and each of the shoes has a first surface which slideably bears against the planar surface and a second surface which radially extends from the shoes. A holddown plate is positioned in overlying relationship to the second surfaces of the shoes and a resilient retaining means is radially expanded into and extends from an annular groove about the perimeter of the recess in overlying relationship to the holddown plate, the resilient retaining means maintaining the first surfaces of the shoes in slideable bearing relationship with the planar surface.

These and other objects, features and advantages of the present invention will be more clearly understood through a consideration of the following detailed description.

BRIEF DESCRIPTION OF THE DRAWING

In the course of this description, reference will be frequently made to the attached drawing in which:

FIG. 1 is an exploded view of a preferred embodiment of a cam plate and piston shoe holddown assembly constructed in accordance with the principles of the invention;

FIG. 2 is a cross-sectioned elevation view of the cam plate and holddown assembly of the invention in assembled form; and FIG. 3 is a frontal elevation view of the holddown assembly taken along line 3—3 of FIG. 2.

DESCRIPTION OF THE PREFERRED EMBODIMENT

Referring to FIGS. 1-3, a preferred embodiment of cam plate piston shoe holddown assembly is shown incorporating the principles of the invention. One of the purposes of the holddown assembly is to maintain the slideable surfaces of the piston shoes against the tilted cam or swash plate of the type employed in an axial piston pump or motor device. Such devices are well known and will not be described in detail.

As shown in FIGS. 1 and 2, a tiltable cam or swash plate 10 is shown having a pair of laterally extending trunnion bearings 11 and 12 which provide a pivot axis about which the cam plate may be tilted in order to vary the stroke of the pump or motor device. A pair of appendages 14 may also be carried on the cam plate for engagement by suitable tilt control pistons (not shown) for varying the tilt of the plate about the axis of bearings 11 and 12. It will be understood from the description to follow that, although a variably tiltable cam plate has been shown, the piston shoe holddown assembly which will now be described may be employed with equal facility in a cam plate of the stationary nontiltable type.

A cylindrical recess 16 is provided in the face of the cam plate 10 which is to be adjacent the rotor or barrel (not shown) of the device. The recess 16 extends a part of the way only through the thickness of the plate and includes a flat bottom wall 17 and a cylindrical wall 18 extending outward from the flat bottom wall.

A thrust plate 20 is preferably positioned in the recess 16 against the bottom wall 17 of the recess. The thrust plate 20 has a pair of flat planar surfaces 21 and 22. The thrust plate is preferably not stationarily fixed to the cam plate, but surface 21 is free to slideably rotate within the cam plate recess against the bottom wall 17 of the recess.

Each of the pistons 24 includes a cylindrical portion 26 which is adapted to extend into the respective cylinders of the rotor (not shown) of the pump or motor device and a pivotal piston shoe 28 is carried at the distal end of each of the pistons. The piston shoe 28 comprises a ball member 29 which is fixed to the end of the cylindrical portion of the piston and which is received in a socket member 30. The end of the socket member furthest from the ball is formed with an enlarged shoulder 32 having a first surface 33 which is adapted to slideably contact the outer planar surface 22 of the thrust plate 20, as shown in FIG. 2, and a second surface 34 which faces outward of the recess.

Each of the pistons 24 is positioned so as to extend through an aperture 36 of a holddown plate 38. The several apertures 36 of the holddown plate are somewhat smaller in diameter than the surfaces 34 of the shoes and are spaced about the periphery of the plate. Once holddown plate 38 has been fitted over the pistons and the cylindrical portion 30 of their shoes, this assembly is inserted in the recess 16 of the cam plate 10, as shown in FIG. 2. At this point, if no further provision was made to maintain the holddown plate 38 and piston shoes 28 in the recess, the surfaces 33 of the piston shoes would tend to separate from the planar surface 22 of the thrust plate 20 as the respective pistons are on the suction stroke.

In the holddown assembly of the invention, such tendency to separate is prevented by way of an annular groove 40 which is cut into the cylindrical wall 18 of the recess 16. This groove 40 is spaced from the bottom wall 17 by a distance substantially equal to the combined thicknesses of the thrust plate 20, the piston shoulders 32, and the holddown plate 38. A resilient retainer ring 42, which preferably takes the form of a spring ring, is pressed into the recess 16 until it is coplanar with the plane of the annular groove 40. At this point, the resilient retainer ring 42 radially expands into the groove and locks therein such that a portion 44 of the retainer ring extends from the groove in overlying relationship to the holddown plate 38.

If it is desired to disassemble the construction shown in FIG. 2, a simple tool need only be inserted in the apertures 46 adjacent split 48 in the retainer ring 42, and the ends of the ring drawn together so as to reduce the diameter of the ring and disengage the ring from the groove 40.

It will be seen that in the holddown assembly above described, various ones of the components may be readily slideably rotated relative to each other. For example, the surface 33 of the piston shoes 28 will slip along the surface 22 of the thrust plate 20. Since piston shoes 28 extend through the apertures 36 in the holddown plate 38, the holddown plate 38 will also rotate by an amount corresponding to the sliding movement of the piston shoes against the thrust plate. If the cam plate 10 is stationary, the retaining ring 42 which is firmly expanded into groove 40 will also be stationary. In addition, if the thrust plate 20 is not fixed to the cam plate 10, it too will rotate somewhat against the bottom wall 17 of recess 16 as a result of frictionally induced rotation due to movement of the piston shoes 28. Rotation of the thrust plate 20, however, will be at a substantially slower speed than the sliding rotation of the piston shoes.

Since each of the above-mentioned components is movable relative to their adjacent components to one degree or another, it is preferred that at least some of the adjacent components be formed of materials of differing hardness so as to provide for smooth bearing operation. Accordingly, the cam plate 10, thrust plate 20 and retainer ring 42 may be formed of steel, by way of example, and the piston shoe shoulders 32 of brass. Preferably, as shown in FIG. 2, the holddown plate 38 is formed of sintered bronze on steel, the face "a" of the holddown plate contacting the surface 34 of the piston shoes being steel and the other face "b" which is in contact with the retainer ring being sintered bronze. Thereby, the surface 33 of the piston shoes which slideably contacts the thrust plate 20 is softer than the latter, and the surface "b" of the holddown plate 38 which slideably contacts the retainer ring 42 is also softer than the latter.

It will be understood that the embodiment of the present invention which has been described is merely illustrative of an application of the principles of the invention. Numerous modifications may be made by those skilled in the art without departure from the true spirit and scope of the invention.

What is claimed is:

1. In a cam plate for an axial piston fluid pressure device,
   a recess in one of the faces of said cam plate,
   a substantially planar surface in said recess,
   a plurality of piston shoes pivotally attached to the pistons and extending into said recess and being rotatable therein, each of said shoes being spaced from each other about the perimeter of said recess and having a first surface in slideable bearing relationship with said planar surface and a second surface extending radially from said shoes,
   holddown plate means overlying said second surfaces of said shoes and rotatable with said shoes in said recess,
   an annular groove about the perimeter of the recess in said cam plate and lying in a plane substantially parallel to the plane of rotation of said shoes in said recess, and
   resilient retaining means radially expanded into and extending from said groove, said resilient retaining means overlying said holddown plate means, and maintaining said plate means in said recess in slideable contact therewith when said plate means is rotating in said recess and for maintaining said first surfaces of said rotating shoes in said slideable bearing relationship with said planar surface, one face of said holddown plate means contacting said second surface of said piston shoes and the other face of said holddown plate means slidably contacting said resilient retaining means, said other face of said plate means having a hardness differing from the hardness of said one face of the plate means and the portion of said resilient retaining means in slidable contact therewith.

2. In the cam plate of claim 1 wherein said resilient retaining means comprises a spring ring.

3. In the cam plate of claim 1 wherein said one face of the plate means is steel and said other face is sintered bronze.

4. In the cam plate of claim 1 wherein said planar surface comprises a thrust plate positioned in said recess.

5. In the cam plate of claim 1 wherein the distance between the plane of said annular groove and said planar surface in said recess is substantially equal to the sum of the distance between the first and second surfaces of said shoes and the thickness of said holddown plate means.

6. In the cam plate of claim 1 wherein the plane of said annular groove intersects the recess intermediate its depth.

* * * * *